United States Patent
Al-Anazi et al.

(10) Patent No.: US 12,540,536 B2
(45) Date of Patent: Feb. 3, 2026

(54) MACHINE-LEARNED BASED REAL-TIME VIRTUAL GAS METERING

(71) Applicant: SAUDI ARABIAN OIL COMPANY, Dhahran (SA)

(72) Inventors: Ammal F. Al-Anazi, Dammam (SA); James O. Arukhe, Dhahran (SA); Fatai A. Anifowose, Al-Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 923 days.

(21) Appl. No.: 17/804,413

(22) Filed: May 27, 2022

(65) Prior Publication Data

US 2023/0383633 A1  Nov. 30, 2023

(51) Int. Cl.
*E21B 43/16* (2006.01)
*E21B 43/12* (2006.01)
*E21B 47/07* (2012.01)

(52) U.S. Cl.
CPC .............. *E21B 43/16* (2013.01); *E21B 43/12* (2013.01); *E21B 47/07* (2020.05); *E21B 2200/20* (2020.05); *E21B 2200/22* (2020.05)

(58) Field of Classification Search
None
See application file for complete search history.

(56) References Cited

U.S. PATENT DOCUMENTS 10,378,324 B2 * 8/2019 Conn ................. G05B 13/0275
2015/0377667 A1 12/2015 Ahmad et al.
2019/0284926 A1 * 9/2019 Tiss ........................ E21B 43/00
2020/0133251 A1 4/2020 Rossi
2021/0089905 A1 3/2021 Olsen et al.
2021/0181374 A1 6/2021 Sandnes et al.
2021/0301644 A1 9/2021 Rao et al.
2021/0340869 A1 11/2021 Syresin et al.

(Continued)

FOREIGN PATENT DOCUMENTS

AU    2016271165 B2    7/2019
WO    WO-2017223483 A1 * 12/2017 ............. E21B 43/00

OTHER PUBLICATIONS

Office Action issued in corresponding Saudi Arabian Application No. 123447152; dated Nov. 4, 2024 (16 pages).

(Continued)

*Primary Examiner* — Kamini S Shah
(74) *Attorney, Agent, or Firm* — Osha Bergman Watanabe & Burton LLP (57) ABSTRACT

A method including receiving modeling data, wherein the modeling data includes field instrument data and associated gas flow rate data for a first plurality of wells. The method further includes splitting the modeling data into a train set, a validation set, and a test set and pre-processing the modeling data. The method further includes selecting a machine-learned model and architecture and training the machine-learned model to predict gas flow rates from the pre-processed modeling data using the training set. The method further includes using the machine-learned model to predict gas flow rates using real-time field instrument data from a second plurality of wells, wherein the real-time field instrument data has been pre-processed similarly to the modeling data.

18 Claims, 6 Drawing Sheets

(56) References Cited

U.S. PATENT DOCUMENTS

2021/0381865 A1   12/2021   Ellison

OTHER PUBLICATIONS

Al-Anazi, A. and I.D. Gates, "Support-Vector Regression for Permeability Prediction in a Heterogeneous Reservoir: A Comparative Study", Jun. 2010 SPE Reservoir Evaluation & Engineering, Society of Petroleum Engineers, 2010, pp. 485-495 (11 pages).
Andrianov, Nikolai, "A Machine Learning Approach for Virtual Flow Metering and Forecasting", IFAC PapersOnLine, ScienceDirect, Elsevier Ltd., vol. 51, No. 8, 2018, pp. 191-196 (6 pages).
Guillen-Rondon, Pablo, et al., "Support Vector Machine Application for Multiphase Flow Pattern Prediction", Proceedings of the Workshop on Data Mining for Geophysics and Geology, 2018, pp. 1-7 (7 pages).
Dettinger, Marcel, et al., "Automated detection of hot-gas path defects by support vector machine based analysis of exhaust density fields", Journal of the Global Power and Propulsion Society, Jul. 2021, pp. 1-16 (16 pages).
Omrani, Pejman Shoeibi, et al., "Improving the Accuracy of Virtual Flow Metering and Back-Allocation through Machine Learning", SPE-192819-MS, Society of Petroleum Engineers, Nov. 2018, pp. 1-15 (15 pages).
Sanzo, Simona, et al., "Virtual Metering and Allocation using Machine Learning Algorithms", IPTC-20185-MS, International Petroleum Technology Conference, Jan. 2020, pp. 1-13 (13 pages).

\* cited by examiner

MACHINE-LEARNED BASED REAL-TIME VIRTUAL GAS METERING

BACKGROUND

The extraction and production of oil and gas from a well, or an oil and gas field composed of at least one well, is a complex process. The production properties of a reservoir, accessed by one or more well, will change over time. For example, reservoir production may change due to falling pressure and increased water content. Over the lifecycle of the oil and gas field many decisions will be taken in order to meet both short- and long-term production goals and extend the life cycle of a well. In general, optimization of an oil and gas field seeks to maximize hydrocarbon recovery while minimizing cost, wherein cost is accrued through the allocation of resources and energy. To properly inform oil and gas field optimization decisions and estimate reservoir retention, it is important to accurately measure or estimate the gas flow rate from each well in an oil and gas field.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method. The method includes receiving modeling data, wherein the modeling data includes field instrument data and associated gas flow rate data for a first plurality of wells. The method further includes splitting the modeling data into a train set, a validation set, and a test set and pre-processing the modeling data. The method further includes selecting a machine-learned model and architecture and training the machine-learned model to predict gas flow rates from the pre-processed modeling data using the training set. The method further includes using the machine-learned model to predict gas flow rates using real-time field instrument data from a second plurality of wells, wherein the real-time field instrument data has been pre-processed similarly to the modeling data.

Embodiments disclosed herein generally relate to a non-transitory computer readable medium storing instructions executable by a computer processor. The instructions include functionality for receiving modeling data, wherein the modeling data includes field instrument data and associated gas flow rate data for a first plurality of wells. The instructions further include functionality for splitting the modeling data into train, validation, and test sets and pre-processing the modeling data. The instructions further include functionality for selecting a machine-learned model and architecture and training the machine-learned model to predict gas flow rates from the pre-processed modeling data using the training set. The instructions further include functionality for using the machine-learned model to predict gas flow rates using real-time field instrument data from a second plurality of wells, wherein the real-time field instrument data has been pre-processed similarly to the modeling data.

Embodiments disclosed herein generally relate to a system. The system includes a first plurality of wells, wherein each well in the first plurality of wells is configured with a plurality of field instruments and a physical gas meter. The system further includes a second plurality of wells, wherein each well in the second plurality of wells is configured with a plurality of field instruments. The system further includes a trained machine-learned model, wherein training the machine-learned model includes receiving field instrument data from the field instruments of the first plurality of wells and receiving gas flow rate data from each physical gas meter in the first plurality of wells. Training the machine-learned model further includes pre-processing the field instrument data from the first plurality of wells and splitting the pre-processed field instrument data into train, validation, and test sets. Training the machine-learned model further includes selecting a machine-learned model and architecture and training the machine-learned model to predict gas flow rate data from the pre-processed field instrument data using the training set. The system further includes using the trained machine-learned model to predict gas flow rate data for the second plurality of wells upon receiving field instrument data from the field instruments of the second plurality of wells, wherein the field instrument data from the second plurality of wells is pre-processed like unto the field instrument data from the first plurality of wells.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein leverage the power of machine learning methodology to predict gas flow rate in real-time using the pressure, temperature, and choke size measurements obtained from real-time production-line sensors. Rather than using derived equations based on certain assumptions or linear regression methods that rely on simply minimizing the errors in the linear relationships between the sensor measurements and the gas flow rate, embodiments disclosed herein use a support vector regression method with a constraint on the training error bound. The meter utilizes a database consisting of surface sensor data and/or downhole data along with measured flow rates to estimate a gas flow rate. The database will be used to extract hidden relationships between some defined input sensor parameters and actual rates based on physical measurements using Support Vector Machines regression model to trace contributing sources. The method provides better generalization capability over conventional models that employ empirical risk minimization principle.

The new technique devises a virtual system that can be simply operated and maintained with minimum cost and time. As the gas field is put on stream and dynamic data are collected, online gas measurements can be made available. Once the gas model is in-service and additional wells are added or wells start to change behavior, the model requires updating using measured data.

Figure 1:
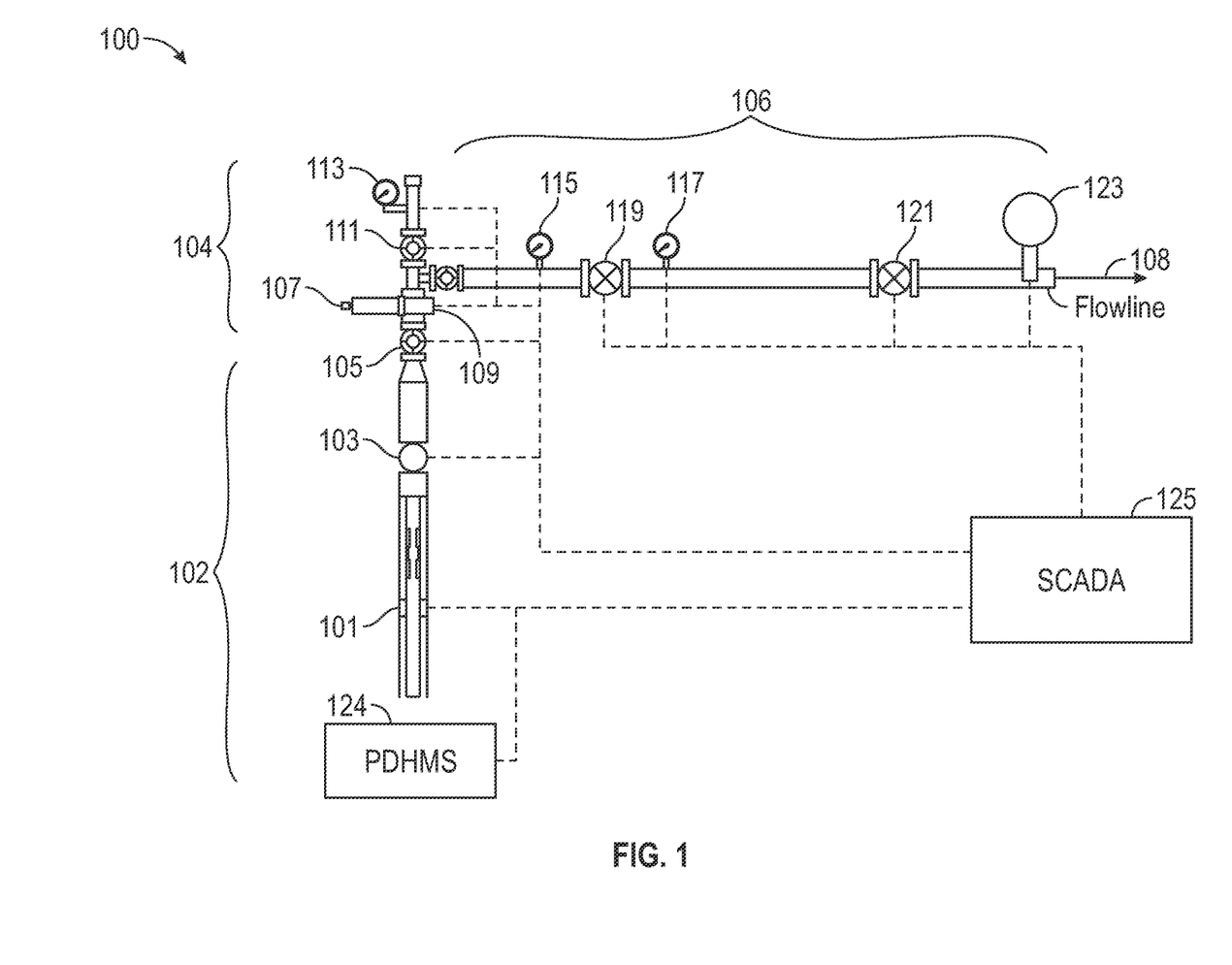
FIG. 1 depicts an oil and gas pipeline in accordance with one or more embodiments.

In accordance with one or more embodiments, FIG. 1 depicts a simplified portion of a pipeline (100) of a well in an oil and gas field. Herein, an oil and gas field is broadly defined to consist of wells which produce at least some oil and/or gas. Hydrocarbon wells typically produce oil, gas, and water in combination. The relative amounts of oil, gas, and water may differ between wells and vary over any one well's lifetime.

For clarity, the pipeline (100) is divided into three sections; namely, a subsurface (102) section, a wellhead and tree (104) section, and a flowline (106) section. It is emphasized that pipelines (100) and other components of wells and, more generally, oil and gas fields may be configured in a variety of ways. As such, one with ordinary skill in the art will appreciate that the simplified view of FIG. 1 does not impose a limitation on the scope of the present disclosure. As part of the subsurface (102) section, FIG. 1 shows an inflow control valve (ICV) (101). An ICV (101) is an active component usually installed during well completion. The ICV (101) may partially or completely choke flow into a well. Generally, multiple ICVs (101) may be installed along the reservoir section of a wellbore. Each ICV (101) is separated from the next by a packer. Each ICV (101) can be adjusted and controlled to alter flow within in the well and, as the reservoir depletes, prevent unwanted fluids from entering the wellbore. The subsurface (102) section of the pipeline (100) has a subsurface safety valve (SSSV) (103). The SSSV (103) is designed to close and completely stop flow in the event of an emergency. Generally, an SSSV (103) is designed to close on failure. That is, the SSSV (103) requires a signal to stay open and loss of the signal results in the closing of the valve. Also shown as part of the subsurface (102) section is a permanent downhole monitoring system (PDHMS) (124). The PDHMS (124) consists of a plurality of sensors, gauges, and controllers to monitor subsurface flowing and shut-in pressures and temperatures. As such, a PDHMS (124) may indicate, in real-time, the state or operating condition of subsurface equipment and the fluid flow.

Turning to the wellhead and tree (104) section of FIG. 1 is a master valve (MV) (105), a surface safety valve (SSV) (107), and a wing valve (WV) (109). The MV (105) controls all flow from the wellbore. For safety considerations, a MV (105) is usually considered so important that two master valves (MVs) (second not shown) are used wherein one acts as a backup. Like unto the SSSV (103), the SSV (107) is a valve installed on the upper portions of the wellbore to provide emergency closure and stoppage of flow. Again, SSVs (107) are designed to close on failure. One or more WVs (109) may be located on the side of the tree (104) section, or on temporary surface flow equipment (not shown). WVs (109) may be used to control and isolate production fluids and/or be used for treatment or well-control purposes.

Also shown in FIG. 1 is a control valve (CV) (111) and a pressure gauge (PG) (113). The CV (111) is a valve that controls a process variable, such as pressure, flow, or temperature, by modulating its opening. The PG (113) monitors the fluid pressure at the tree (104) section.

Turning to the flowline (106) section, the flowline (106) transports (108) the fluid from the well to a storage or processing facility (not shown). A choke valve (119) is disposed along the flowline (106). The choke valve (119) is used to control flow rate and reduce pressure for processing the extracted fluid at a downstream processing facility. In particular, effective use of the choke valve (119) prevents damage to downstream equipment and promotes longer periods of production without shut-down or interruptions. The choke valve (119) is bordered by an upstream pressure transducer (115) and a downstream pressure transducer (117) which monitor the pressure of the fluid entering and exiting the choke valve (119), respectively. The flowline (106) shown in FIG. 1 has a block and bleed valve system (121) which acts to isolate or block the flow of fluid such that it does not reach other downstream components.

The various valves, pressure gauges and transducers, and sensors, depicted in FIG. 1 may be considered field instruments of an oil and gas field. As shown, these field instruments may be disposed both above and below the surface of the Earth. Further, these field instruments are used to monitor the state and condition of wells in an oil and gas field. It is emphasized that the plurality of field instruments depicted in FIG. 1 are non-exhaustive. Additional devices, such as electrical submersible pumps (ESPs) (not shown) may be present in an oil and gas field with their associated sensing and control capabilities. For example, an ESP may monitor the temperature and pressure of a fluid local to the ESP and may be controlled through adjustments to ESP speed or frequency. Additionally, temperature sensors may be disposed throughout the pipeline (100).

The plurality of field instruments may be distributed, local to their associated components, global, connected, etc. The field instruments may be of various control types, such as a programmable logic controller (PLC) or a remote terminal unit (RTU). For example, a programmable logic controller (PLC) may control valve states, pipe pressures, warning alarms, and/or pressure releases throughout the oil and gas field. In particular, a programmable logic controller (PLC) may be a ruggedized computer system with functionality to withstand vibrations, extreme temperatures, wet conditions, and/or dusty conditions, for example, around a pipeline (100). With respect to an RTU, an RTU may include hardware and/or software, such as a microprocessor, that connects sensors and/or actuators using network connections to perform various processes in the automation system. As such, a distributed control system may include various autonomous controllers (such as remote terminal units) positioned at different locations throughout the oil and gas field to manage operations and monitor sub-processes. Likewise, a distributed control system may include no single centralized computer for managing control loops and other operations.

In accordance with one or more embodiments, FIG. 1 depicts a supervisory control and data acquisition (SCADA) system (125). A SCADA system (125) is a control system that includes functionality for device monitoring, data collection, and issuing of device commands. The SCADA system (125) enables local control at an oil and gas field as well as remote control from a control room or operations center. To emphasize that the SCADA system (125) may monitor and control (where applicable) the various field instruments of an oil and gas field, dashed lines connecting the plurality of field instruments to the SCADA system (125) are shown in FIG. 1.

With respect to oil and gas reservoirs and oil and gas production, accurate and continuous metering of gas flow rate is important to optimize production and effectively manage hydrocarbon reservoirs. In FIG. 1, the flowline (106) may be configured with a multiphase flow meter (MPFM) (123), or other gas meter (venturi meter, orifice meter) (not shown). The MPFM (123) monitors the flow rate of fluid by constituent. That is, the MPFM (123) may detect the instantaneous amount of gas, oil, and water. As such, the MPFM (123) indicates percent water cut (% WC) and the gas-to-oil ratio (GOR). Additionally, the MPFM (123) may measure pressure and fluid density. These physical flow meters are relatively expensive and require frequent maintenance. Consequently, it is common for these devices not to be present on a pipeline (100). To promote distinction between the aforementioned field instruments of a pipeline and fluid and gas meters, herein, fluid and gas meters are not considered field instruments.

As stated, the use of a MPFM (123), or other gas metering device, on the pipeline (100) for each well in an oil and gas field may be prohibited by cost or other factors. Alternatively, in order to estimate the gas flow rate of a pipeline (100), physics-based models, phenomenological models, and/or empirical relationships may be used. Generally, these methods use quantities that are easier (e.g. accessibility) or cheaper to measure. Such quantities may be measured using the field instruments disposed throughout the pipeline which may be collected and monitored using a SCADA system (125). For example, so-called Gilbert-type equations may be used to estimate the rate of fluid flow through a wellhead choke. The general form of these equations is $$q = \alpha \frac{P_1 d^b}{GOR^c}, \qquad (1)$$

where q is the liquid flow rate, $P_1$ is the upstream choke pressure, GOR is the gas-to-oil ratio, d is the internal choke size diameter and $\alpha$, b, and c are empirically determined constants. Another, more complex and modern equation representing the isentropic flow of an ideal gas through a choke given other pipeline parameters is $$q_g = \frac{\pi}{4} d^2 P_{up} \frac{T_{sc}}{P_{sc}} \beta \left( \left( \frac{2 g_c R}{28.97 \, \gamma_g T_{up}} \right) \left( \frac{\gamma}{\gamma - 1} \right) \left[ \left( \frac{P_{dn}}{P_{up}} \right)^{2/\gamma} - \left( \frac{P_{dn}}{P_{up}} \right)^{(\gamma+1)/\gamma} \right] \right)^{\frac{1}{2}}. \qquad (2)$$

In the above equation $q_g$ is the gas flow rate, d is the internal pipe diameter, $P_{up}$ and $P_{dn}$ are the upstream and downstream flowing pressures, respectively, $T_{sc}$ and $P_{sc}$ are the temperature and pressure at standard conditions, respectively, $T_{up}$ is the upstream temperature, $\beta$ is the choke flow coefficient, $g_c$ is the gravity acceleration constant, $\gamma_g$ is the gas gravity, R is the universal gas constant, and $\gamma$ is the ratio of the constant pressure and constant volume heat capacities, $C_p/C_v$. Many additional flow rate estimation equations exist. Some of these equations are designed for specific flow regimes such as sonic single-phase gas flow. However, for concision, additional equations are not listed herein. In some instances, systems of equations may be solved. For example, commercial software applications such as PIPESIM may estimate the steady-state gas flow rate for a plurality of wells using a measured cumulative gas flow rate. While a full explanation of this functionality exceeds the scope of this disclosure, the general methodology is that a system of equations, such as EQ. 2, one for each well, may be solved by applying the appropriate boundary conditions, calibrating unknown parameters with observed quantities, and incorporating additional physical constraints such as the conservation of mass.

While physics-based equations, phenomenological models, and software applications that apply these methods provide interpretable, and even causal, relationships between measured quantities and fluid flow rates, the resulting estimated fluid flow rates are often inaccurate. This is because these equations and models make simplifying assumptions in order to make the equations tractable, do not capture all the physics governing fluid flow, and often don't have the level of discretization (i.e. enough sensory inputs) required for high fidelity.

To summarize, an understanding of gas flow rate is critical for proper management of an oil and gas field. Proper management includes activities and decisions to maximize hydrocarbon production, extend the lifetime of associated wells, accurately model reservoir capacity and conditions, maximize hydrocarbon recovery, mitigate physical and financial risk, and reduce costs. As an example, if a gas meter reveals that the gas flow is less than expected given the current conditions of the well, it may indicate an issue, limitation, or constraint within the well or reservoir. Production operators and engineers use such indications, or other anomalies detected with a gas meter, to troubleshoot and correct the situation. For production operators and engineers, gas rate measurements are crucial to well surveillance and to understand the health of a network of wells in an oil and gas field. Further, precise and accurate gas flow rate estimates are significantly important from an economical perspective because even a minor estimation error could lead to substantial monetary losses when considering the large volumes of gas undergoing custody transfer.

To measure gas flow, physical meters may be disposed throughout an oil and gas field. However, these physical meters are relatively expensive and require frequent maintenance. As such, economical constraints may prohibit the use of physical gas flow rate meters. Likewise, gas flow rates estimated using physics-based equations and/or phenomenological models are unreliable. To remedy these defects, in one aspect, embodiments disclosed herein relate to a system for a virtual gas meter to determine the gas flow rate of a well using a machine-learned model. Machine-learned models, in contrast to physics-based models, need not be constrained by simplifying assumptions and may model complex and non-linear behavior. Further, machine-learned models may operate in real-time, may be applied to transient flow, and may be continuously updated, as needed or as new data is acquired, to accurately capture changes in gas flow rate. As such, virtual gas metering provides more robust estimates of gas flow rates than physics-based models. Whereas physical models may inaccurately reflect production offsets in the form of restarts after a temporary shut-in period, shrinkage or slugging, a virtual meter is able to account for such events in real-time.

Figure 2A:
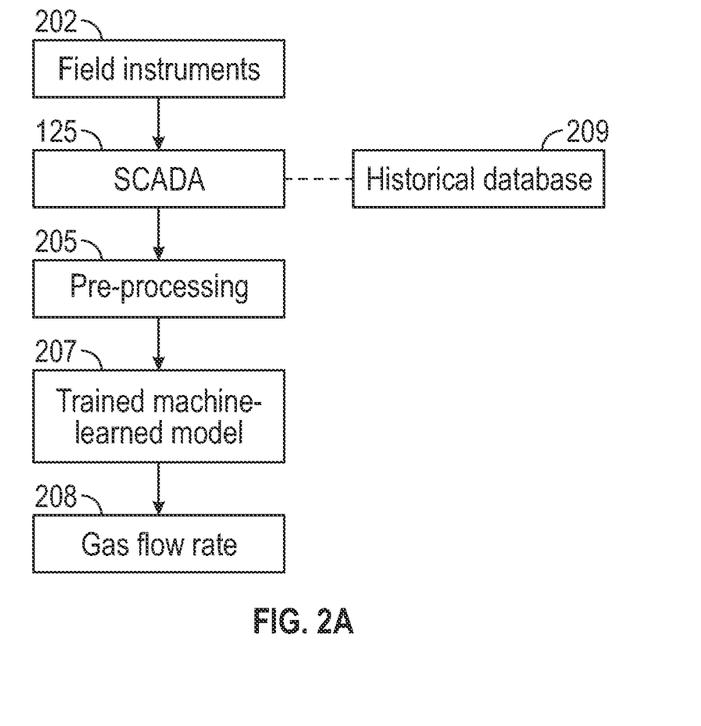
FIG. 2A depicts a flowchart in accordance with one or more embodiments.

In accordance with one or more embodiments, the general process of using a trained machine-learned model (207) to determine a gas flow rate (208) is depicted in FIG. 2A. As shown in FIG. 2A, field instruments (202), such as those discussed in FIG. 1, are used to measure and sense the instantaneous state and condition of pipeline components and the fluid flow at various locations along the pipeline. The field instruments (202) may be disposed above or below the surface of the Earth. Again, it is emphasized that in the present discussion gas and fluid rate meters are not considered field instruments. In accordance with one or more embodiments, the field instruments (202) measure the flowing wellhead pressure (FWHP), the flowing wellhead temperature (FWHT), the choke size of any chokes proximate the wellhead, the bottom hole pressure (BHP), the shut-in wellhead pressure (SIWHP), the inside diameter of the flowline, and the outer diameter of the flowline for each well in an oil and gas field. The measured field instrument (202) values, herein referred to as field instrument data, are collected by the SCADA system (125). The SCADA system (125) is also connected to a historical database (209) such that all field instrument data collected by the SCADA system (125) are stored. As such, a history of field instrument data may be retrieved from the historical database (209).

The field instrument data may undergo pre-processing (205) before being processed by the trained machine-learned model (207). Greater details surrounding pre-processing (205) and obtaining a trained machine-learned model (207) are provided below. The trained machine-learned model (207) can be thought of as a function which transforms the pre-processed field instrument (202) data into a gas flow rate (208). As such, an instantaneous gas flow rate (208) may be determined using field instrument (202) data collected in real-time at each well in an oil and gas field.

In some embodiments, a pipeline (100) may include one or more virtual flow measuring systems (e.g., virtual flow measuring system X (200)) that include functionality for determining one or more gas flow rates. In particular, a virtual flow measuring system may include a control system or other computer device that acquires sensor measurements from multiple sensors with respect to a pipeline (100) (e.g. SCADA system (125)). Based on knowledge of the pipeline (100), a virtual flow measuring system may determine the gas flow rate at a particular location on a pipeline (100) without using a flowmeter. In some embodiments, for example, a virtual flow measuring system uses a trained machine-learned model (206) to determine a respective flow rate. Using a trained machine-learned model (206), a virtual flow measuring system may use pressure data and/or temperature data in relation to choke size and other pipeline parameters (e.g. inner and outer diameter size) to determine the gas flow rate.

Figure 2B:
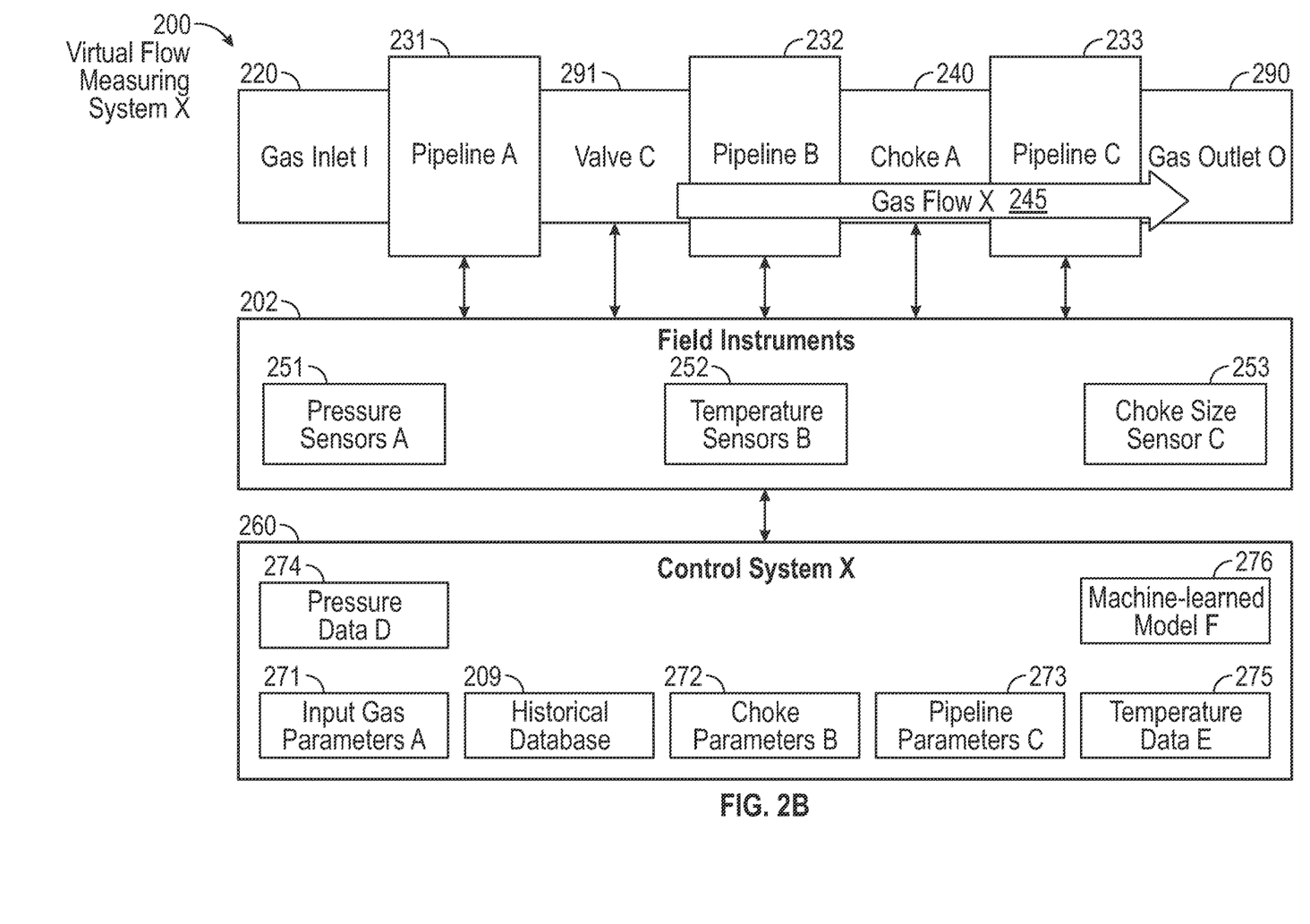
FIG. 2B depicts a system in accordance with one or more embodiments.

Turning to FIG. 2B, FIG. 2B shows a schematic diagram in accordance with one or more embodiments. As shown in FIG. 2B, a virtual flow measuring system (e.g., virtual flow measuring system X (200)) may include a control system (e.g., control system X (260)), a choke (e.g., choke A (240)), one or more portions of the pipeline (100) (e.g., pipeline A (231), pipeline B (232), pipeline C (233)), one or more gas inlets (e.g., gas inlet I (220)), one or more gas outlets (e.g., gas outlet O (290)), and various sensors (e.g., pressure sensors A (251), temperature sensors B (252), choke size sensor C (253)). The collection of sensors disposed on a pipeline (100) may be considered field instruments (202). As illustrated in FIG. 2B, for example, the virtual flow measuring system X (200) determines a rate of gas flow X (245) of a gas stream in a pipeline (100) that passes through an open valve C (291) to the gas outlet O (290).

In some embodiments, a control system in the virtual flow measuring system includes a gas flow model (e.g., machine-learned model F (276)). In particular, a gas flow model may functionally relate measured quantities from the field instruments (202) to determine a gas flow rate. For example, a gas flow model may specify various input parameters (e.g., input gas parameters A (271), choke parameters B (272), pipeline parameters C (273), pressure data D (274), and temperature data E (275)) to model a particular type of gas. For example, input gas parameters for a predetermined gas may include molecular weights, density values, expansion factors regarding the compressibility or incompressibility of a gas flow, etc. Choke parameters may describe a particular restricted orifice, such as a diameter ratio of a restricted orifice, a discharge coefficient that may describe the ratio of an actual discharge through the orifice in relation to the theoretical discharge, a plate expansion factor, etc. Pipeline parameters may include one or more physical pipe dimensions, such as an inside diameter of one or more pipes or a length of pipe, for example. Pressure data may include pressure sensor values for one or more pressure sensors. Temperature data may include temperature sensor values for one or more temperature sensors. Additionally, the control system may be connected to historical database (209) to store and preserve the data acquired by the field instruments (202).

Figure 3:
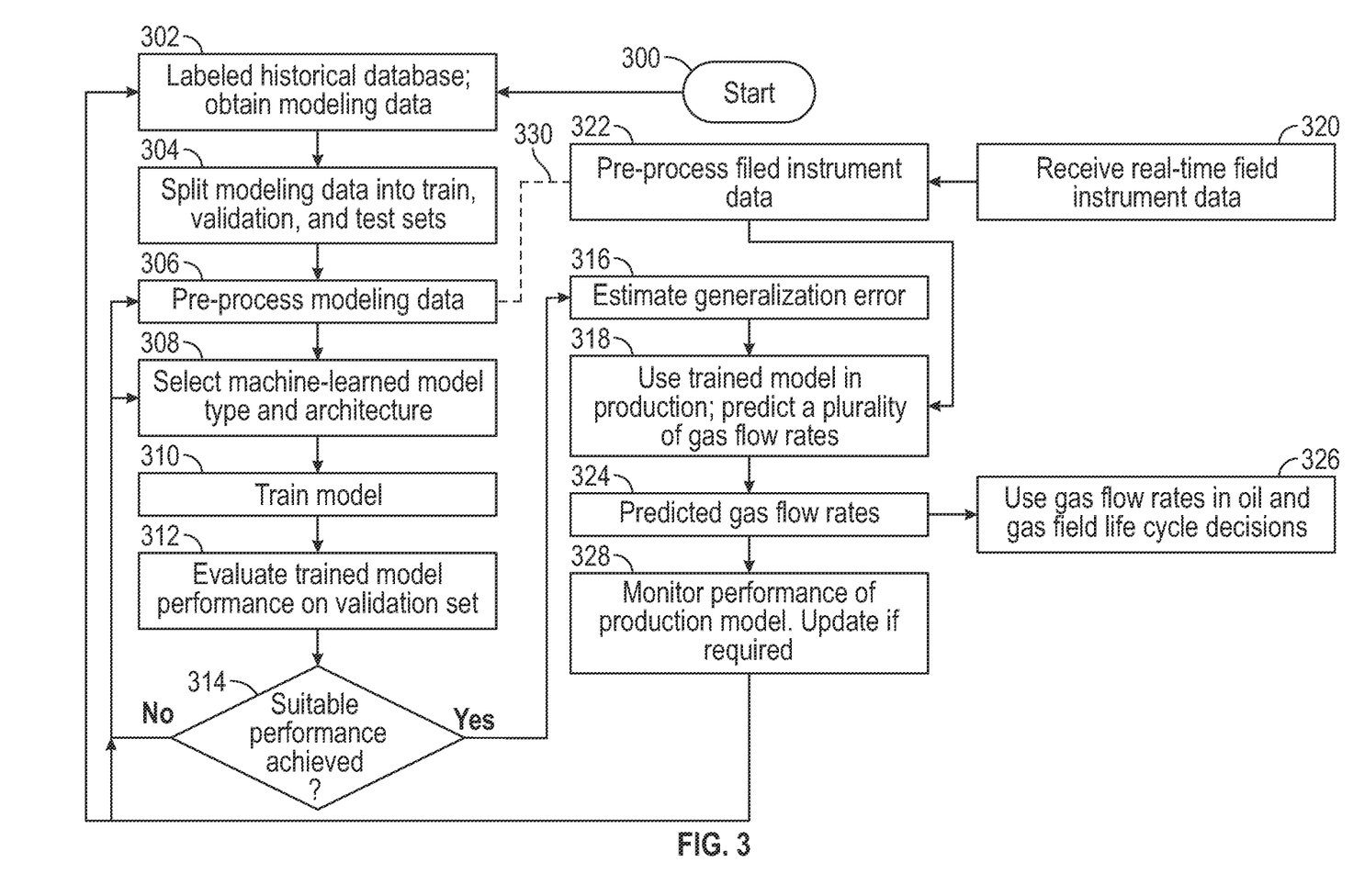
FIG. 3 depicts a flowchart in accordance with one or more embodiments.

In accordance with one or more embodiments, FIG. 3 depicts a flowchart (300) which outlines the process of obtaining and using a trained machine-learned model (207) in greater detail. As shown in block 302, the process starts by accessing a labelled historical database. The labelled historical database is like the historical database (209) shown in FIG. 2 in that it is composed of field instrument (202) data, however, the labelled historical database also contains associated gas flow rate data. That is, the labelled historical database is constructed by recording field instrument (202) data and gas flow rate data measured with a physical meter on wells where physical meters are employed. Typically, in the case of multiple wells, the wells from which the field instrument (202) data and gas flow rate data are collected, should be diverse, for example, in terms of their flow conditions, to promote robustness and generalization performance of the final machine-learned model. The combination of collected field instrument (202) data and gas flow rate data is hereafter referred to as the "modeling data".

As shown in block 304, the modeling data is split into training, validation, and test sets. In some embodiments, the validation and test set may be the same such that the data is effectively only split into two distinct sets. Recall that the modeling data consists of the field instrument (202) data and associated gas flow rate data for at least one well. While the modeling data may be split at the level of a single data point (i.e. field instrument (202) values and gas flow rate for a well at a given instance in time), a more robust practice is to split the modeling data according to individual wells. For example, the training set may be composed of the modeling data from a first well and a second well, the validation set may be composed of the modeling data from a third well, and the test set may be composed of the modeling data from a fourth well.

In block 306, the modeling data is pre-processed. Pre-processing (205), at a minimum, involves altering the data so that it is suitable for use with machine-learned models. For example, numericalizing categorical data or removing data entries with missing values. Other typical pre-processing methods are normalization and imputation. Normalization is the process of transforming the modeling data with an intention to aid the machine-learned model. An example normalization process is to determine the mean ($\mu$) and standard deviation ($\sigma$) of the values of each instrument in the field instrument (202) data. For clarity, the values measured and collected over time with an associated instrument may be considered an instrument log. In other words, an instrument log is a time-series of values measured with a specific field instrument (202). As such, the field instrument (202) data may contain a flowing wellhead pressure (FWHP) log, a flowing wellhead temperature (FWHT) log, etc. Continuing with the example, if the flowing wellhead pressure (FWHP) is measured throughout multiple wells, the FWHP logs are appended across wells and the mean ($\mu$) and standard deviation ($\sigma$) of the FWHP logs is calculated. To normalize the field instrument (202) data, using the mean ($\mu$) and standard deviation ($\sigma$) of each instrument log, the mean ($\mu$) is subtracted from every value (210) in said instrument log and the result is divided by the standard deviation ($\sigma$) of said instrument log as shown in the following equation:

$$NV_{i,log} = \frac{\text{value}_{i,log} - \mu_{log}}{\sigma_{log}}. \quad (3)$$

In EQ. 3, $NV_{i,log}$ represents the normalized value of a single value, indexed by i, for a specific log, log. For example, log could be the FWHP log such that $\mu_{log}$ and $\sigma_{log}$ represent the mean ($\mu$) and standard deviation ($\sigma$) of all the FWHP log values in the field instrument (202) data, respectively, over all the wells for which modeling data was collected. value$_{i,log}$ is a single value from a specified instrument log; for example, the FWHP log at a certain time for a single well. The index i is unique to each time value and each well, in the case of multiple wells. As such, EQ. 3 transforms value$_{i,log}$ to a normalized value, $NV_{i,log}$. One with ordinary skill in the art will appreciate that there are many normalization processes available, and the inclusion of a single example, namely, that shown in EQ. 3, does not limit the scope of this disclosure.

Imputation is the process of replacing missing values, corrupted values, or outlier values in a set of data with a substitute value so that the data may be used in a machine-learned model. One imputation strategy may be to replace values with the nearest acceptable value in the data set. Here, "nearest" is taken with respect to time with an additional note that acceptable substitute values are limited to the well for which the value is being replaced, in the case of multiple wells. As a concrete example, consider FWHP logs collected from two wells. A portion of the FWHP log of the first well may look like {(time: 1.3 s, pressure: 345 psi), (time: 5.4 s, pressure: 350 psi), (time: 9.5 s, pressure: 347 psi)} and a portion of FWHP log from the second well may look like {(time: 1.0 s, pressure: 451 psi), (time: 5.0 s, pressure: NAN psi), (time: 10.0 s, pressure: 460 psi)}, where "NAN" stands for "not a number" and indicates a missing or corrupted value. Using the nearest value imputation strategy described above, the missing FWHP log value found in the second well would be replaced by the value of 451 psi. This is because this substitute value is at the nearest time to the missing value within the same well. It is emphasized that the partial FWHP logs shown above are provided solely as an example. In practice, FWHP logs may have a different sampling frequency and may contain additional information.

Note that, although not common, the collected gas flow rate data may undergo a normalization and imputation process. The normalization and imputation methods applied to the gas flow rate data may be independent, or different, than those applied to the field instrument (202) data. Likewise, different and independent normalization and imputation processes may be applied to the individual instrument logs of the field instrument (202) data.

Information surrounding the pre-processing (205) steps is saved for potential later use. For example, if the normalization is performed according to EQ. 3 for each instrument log in the field instrument (202) data, then the mean ($\mu$) and standard deviation ($\sigma$) of each log is saved, or stored—likely with a computer medium. This allows future instrument logs to be pre-processed identically.

One with ordinary skill in the art will recognize that a myriad of pre-processing methods beyond numericalization, normalization, and imputation exist. Descriptions of a select few pre-processing methods herein do not impose a limitation on the pre-processing steps encompassed by this disclosure. Further it is noted that pre-processing may be performed before the modeling data is split into train, validation, and test sets. That is, the order of blocks 304 and 306 may be readily interchanged. In the case that pre-processing occurs after the modeling data has been partitioned to various sets, it is common practice to select a pre-processing strategy and determine any associated parameters, such as the mean ($\mu$) and standard deviation ($\sigma$) of EQ. 3, using only the training set.

In accordance with one or more embodiments, and as depicted in block 308, a machine-learned model type and architecture are selected. Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

Machine-learned model types may include, but are not limited to, neural networks, random forests, generalized linear models, and Bayesian regression. Machine-learned model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding a model is referred to as selecting the model "architecture". In short, block 308 references selecting a machine-learned model type and a set of governing hyperparameters.

Once a machine-learned model type and hyperparameters have been selected, the machine-learned model is trained using the training set of the modeling data according to block 310. Common training techniques, such as early stopping, adaptive or scheduled learning rates, and cross-validation may be used during training without departing from the scope of this disclosure.

During training, or once trained, the performance of the trained machine-learned model is evaluated using the validation set as depicted in block 312. Recall, that in some instances, the validation set and test set are the same. Generally, performance is measured using a function which compares the predictions of the trained machine-learned model to the values on record. In the present case, the trained machine-learned model would make predictions for the gas flow rate of a well given the field instrument (202) data at an instance in time using the field instrument (202) data of the validation set. The predicted gas flow rates would be compared to the known gas flow rates in the validation set with a user-prescribed comparison function. A commonly used comparison function is the mean-squared-error function, which quantifies the difference between the predicted value and the actual value, however, one with ordinary skill in the art will appreciate that many more comparison functions exist and may be used without limiting the scope of the present disclosure.

Block 314 represents a decision: if the trained machine-learned model performance, as measured by a comparison function, is not suitable, the machine-learned model type and architecture are altered, as shown in block 308, and the training process is repeated. There are many ways to alter the machine-learned model type and architecture in search of suitable trained machine-learned model performance. These include, but are not limited to: selecting a new model type from a previously defined set of model types; randomly perturbing or randomly selecting new hyperparameters; using a grid search over the available hyperparameters; intelligently altering the model type or hyperparameters based on the observed performance of previous models (e.g., a Bayesian hyperparameter search). Additionally, different pre-processing steps may be employed. Once suitable performance is achieved, the training procedure is complete and the generalization error of the trained machine-learned model is estimated according to block 316.

Generalization error is an indication of the trained machine-learned model's performance on new, or un-seen data. Using the gas flow rates as an example, the generalization error indicates how well the trained machine-learned model can predict the gas flow rate, at every instance in time, of a well using the field instrument (202) data of said well. Typically, the generalization error is estimated using the comparison function, as previously described, to compare the predicted aggregate gas flow rates to the actual gas flow rates using the test set.

As depicted in block 318, the trained machine-learned model is used "in production"—which means the trained machine-learned model is used to predict a gas flow rate, at each given instance in time, using the field instrument (202) data of a well. This eliminates the need to use a physical metering device. In practice, real-time field instrument (202) data is received from one or more wells without a physical metering device, as shown in block 320. It is emphasized field instrument (202) data used to make predictions in the production setting, as well as for the validation and test sets, are pre-processed identically to the manner defined in block 306 as denoted by the connection (330), represented as a dashed line in FIG. 3, between blocks 322 and 306. The trained machine-learned model outputs predicted gas flow rates, as depicted in block 324. In block 326, the predicted gas flow rates are used in oil and gas lifecycle, operation, and management decisions.

As shown in block 328, the performance of the trained machine-learned model is continuously monitored in the production setting. Performance monitoring includes statistical comparisons of field instrument (202) data of new wells to the field instrument (202) data of the training set to identify data drift. Occasionally, a new well may use a physical gas flow rate meter. The gas flow rate values, as measured with a physical meter on the new well, may be compared to their predicted values from the trained machine-learned model using a comparison function to monitor performance. If model performance is suspected to be degrading, as observed through data drift or newly acquired performance metrics, the model may be updated. An update may include retraining the model, by reverting to block 308, with the newly acquired modeling data (field instrument (202) data and gas flow rate data from a new well) appended to the training data. An update may also include returning to block 406 to recalculate any pre-processing parameters, again, after appending the newly acquired modeling data to the existing modeling data in the labelled historical database.

While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In accordance with one or more embodiments, the machine-learned model is a support vector machine regressor. In alignment with the described use of the machine-learned model of the present disclosure, a support vector machine regressor, once trained, may be considered a function which accepts an input and produces an output. As such, the support vector machine regressor may receive, as an input, pre-processed field instrument (202) data and return a gas flow rate. In general, a support vector machine regressor may be decomposed into two parts. First, a support vector machine regressor transforms the input data to a feature space. The feature space is usually a higher dimensional space than the space of the original input data. The transformation is performed using a function from a family of functions often referred to in the literature as "kernel" functions. Many kernel functions exist and kernel functions may be created, usually through a combination of other kernel functions, according to a specific use-case. The choice of kernel function for a support vector machine regressor is a hyperparameter of the support vector machine model. Kernel functions possess certain mathematical properties. While a complete description of kernel functions and their associated properties exceeds the scope of this disclosure, it is stated that an important property of kernel functions is that they are amenable to the so-called "kernel trick". The kernel trick allows for distances to be computed between pairs of data points in the feature space without actually transforming the data points from the original input space to the feature space. The second part of a support vector machine consists of parameterizing a hyperplane in the feature space. The hyperplane is described by a set of weights, $\{w_0, w_1, \ldots, w_n\}$. The hyperplane represents the predicted value of the support vector machine regressor given an input and can be written as $$y = w_0 + \sum_{i=1}^{n} w_i x_i, \tag{4}$$

where y is the value of the hyperplane and $x_i$ is a value on an axis i of the feature space where the feature space has n dimensions. Note that in some implementations a support vector machine regressor and associated kernel, the weight $w_0$ may be included in the summation. The set of weights may be described using a vector w. Likewise, a data point in the feature space may be described as a vector x. Incorporating $w_0$ into the weight vector and using vector notation, the prediction for a data point indexed by j may be written as $$y_j = w^T x_j. \quad (5)$$

To determine the values of the weights for a support vector machine regressor, also known as training the support vector machine model, the following optimization problem is solved:

$$\min \frac{1}{2} \|w\|^2 \quad (6)$$

subject to: $|y_j - w^T x_j| \leq \epsilon, \forall j$ in training data, where $\epsilon$ is an error term, set by the user and may be considered another hyperparameter of the support vector machine model. From EQ. 5, it is seen that $w^T x_j$ represents the predicted value, or in the context of the present disclosure, the predicted gas flow rate, for a training data point $x_j$. As such, the constraint $|y_j - w^T x_j| \leq \epsilon$ in EQ. 6 indicates that the difference between the actual value $y_j$ and the predicted value $w^T x_j$ must be smaller than some pre-defined error $\epsilon$. While this is an acceptable practice, it is noted that the hyperplane determined by EQ. 6 is quite sensitive to outlier data values. This is because the entirety of the hyperplane may need to be altered, often adversely, in order to accommodate the constraint of EQ. 6 for an outlier data point, or the value of $\epsilon$ may have to be increased. To mitigate the negative affects of outliers in the data, and more generally to produce a support vector machine regressor with greater predictive power, EQ. 6 is altered to included slack terms $\xi_j$ and a regularization term $\lambda$ as follows:

$$\min \left( \frac{1}{2} \|w\|^2 + \lambda \sum_{j=1}^{m} |\xi_j| \right) \quad (7)$$

subject to: $|y_j - w^T x_j| \leq \epsilon + |\xi_j|, \forall j.$

In EQ. 7, there are m data points in the training set and the data points are indexed by j. For each training data point there is a slack term $\xi_j$ which can alleviate the constraint. As such, the constraint may be satisfied, for example, for outlier data points, without altering the hyperplane. If the slack terms were allowed to grow without limitation, the slack terms would obviate the constraint. To counter this, the slack terms are preferred to be kept at minimal values as demonstrated by the second term to be minimized, $\Sigma_{j=1}^{m} |\xi_j|$. The inclusion of the second term in the minimization operator introduces a tradeoff between adjusting the hyperplane and limiting the slack terms. This tradeoff is controlled by the regularization term $\lambda$, which may be considered a hyperparameter of the support vector machine model.

Figure 4:
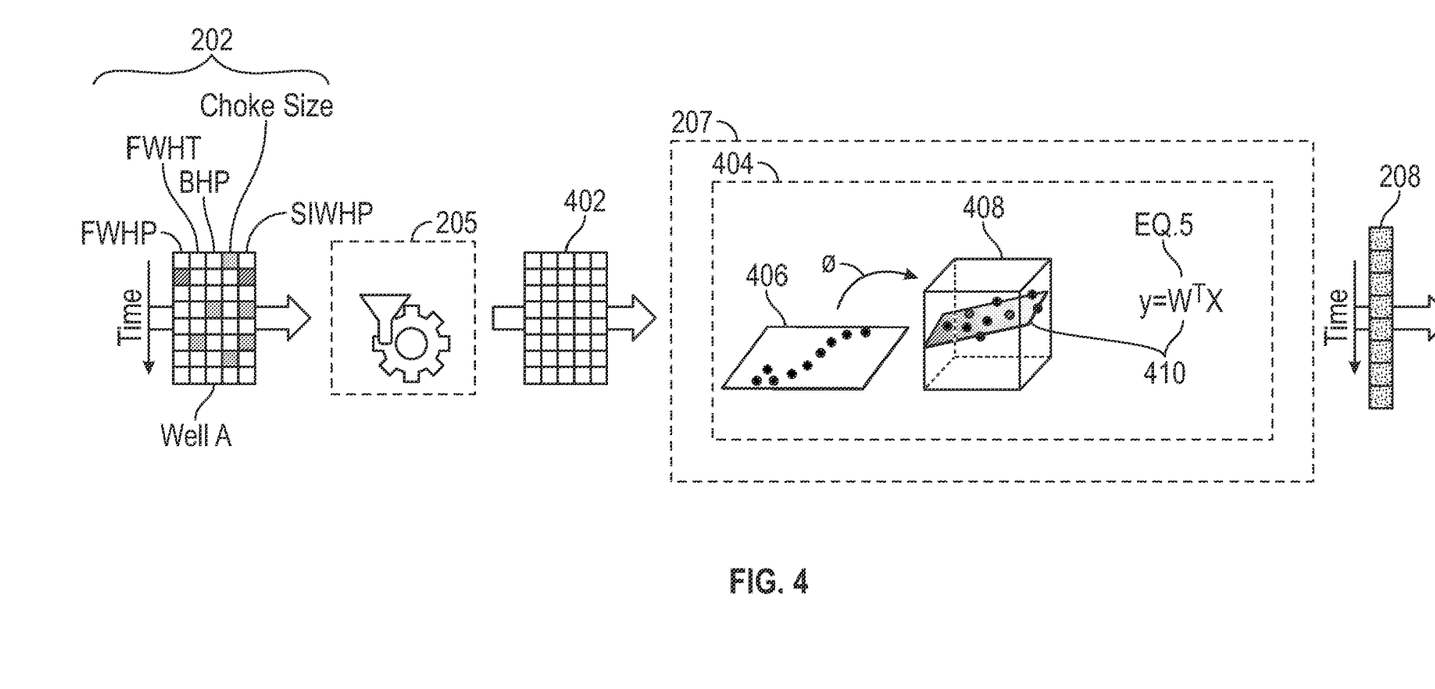
FIG. 4 depicts a modeling process in accordance with one or more embodiments.

In accordance with one or more embodiments, FIG. 4 depicts blocks 318, 320, 320, and 324 of FIG. 3, which consist of determining gas flow rates (208) using a trained machine-learned model (207), where the trained machine-learned model (207) is a trained support vector machine regressor (404). As shown in FIG. 4, field instrument (202) data is collected for a well. For the example of FIG. 4, the field instrument (202) is collected in real-time for a single well named Well A. In the example of FIG. 4, the field instrument (202) data collected includes the flowing wellhead pressure (FWHP), the flowing wellhead temperature (FWHT), the choke size of a choke near the wellhead, the bottom hole pressure (BHP), and the shut-in wellhead pressure (SIWHP). In other embodiments, instrument logs from different field instruments (202) may be used with the caveat that the machine-learned model needs to be trained according to the expected field instrument (202) data. The field instrument (202) data undergoes pre-processing (205). Pre-processing (205) may include normalization and imputation. Recall that the exact pre-processing (205) procedure is determined while training the machine-learned model. For clarity in FIG. 4, after pre-processing (205), the data is referred to as pre-processed data (402). The pre-processed data (402) is processed with the trained machine-learned model (207), which, as shown in FIG. 4, is a trained support vector machine regressor (404). The trained support vector machine regressor (404) applies the kernel function selected during training to the pre-processed data (402). In FIG. 4, the transformation of the kernel function is shown with the operator $\phi$ where the pre-processed data (402) is transformed from an input space (406) to a feature space (408). It is noted that the dimensionality of the input space (406) and feature space (408) of FIG. 4 are not necessarily accurate and are provided solely as a graphical aid. Once transformed to feature space (408), EQ. 5, which represents a hyperplane (410), is applied to each data point to determine the gas flow rate (208).

In accordance with one or more embodiments, a machine-learned model is used to determine the gas flow rates (208) for a plurality of wells in an oil and gas field where the wells do not use a physical gas flow rate meter. As an example, consider an oil and gas field with a set of wells labelled Wells B, C, D, and E. Wells B, C, D, and E are each equipped with field instruments capable of measuring quantities such as the flowing wellhead pressure (FWHP), the flowing wellhead temperature (FWHT), and the choke size at each well. The field instrument (202) data of each well may be individually pre-processed (205) and subsequently processed by a trained machine-learned model (207) to determine a gas flow rate (208) in real-time for each well. As a real-time indication of the gas flow rate (208) is available for each well (B, C, D, E), through the trained machine-learned model (207), and as these wells do not employ physical gas rate meters, it may be said that the wells (B, C, D, and E) have "virtual" gas flow rate meters.

In accordance with one or more embodiments, the machine-learned model, such as a support vector machine regressor, may be trained to operate for back allocation. Back allocation, generally defined, is the process of determining the gas flow rates of multiple wells while measuring the cumulative gas flow rate of those wells. For example, an oil and gas field may have a set of wells, referred to herein as Wells F, G, and H. Wells F, G, and H may each have an associated choke valve and field instruments to measure quantities such as the bottom hole pressure (BHP) and flowing wellhead pressure (FWHP) at the wellhead of each well. Wells F, G, and H may have a junction such that the wells share a common flowline. The common flowline may be equipped with a physical gas flow rate meter. As such, the cumulative gas flow rate may be measured. Using the flowchart (300) of FIG. 3, a machine-learned model may be readily adapted or trained to determine the individual gas flow rates of Wells F, G, and H using, as inputs, the cumulative gas flow rate, available field instrument (202) data from the wells, and pipeline information and boundary conditions. Training a machine-learned model for back allocation may be performed using training data from systems of wells with a variety of pipeline configurations. Alternatively, training data may be generated through simulations. For example, software applications such as PIPESIM may be used to estimate individual well allocation given cumulative measurements and descriptors of an oil and gas field network. As such, individual virtual gas flow meters may be applied to a set of wells where the machine-learned model acts on input data describing the system of the wells.

Figure 5:
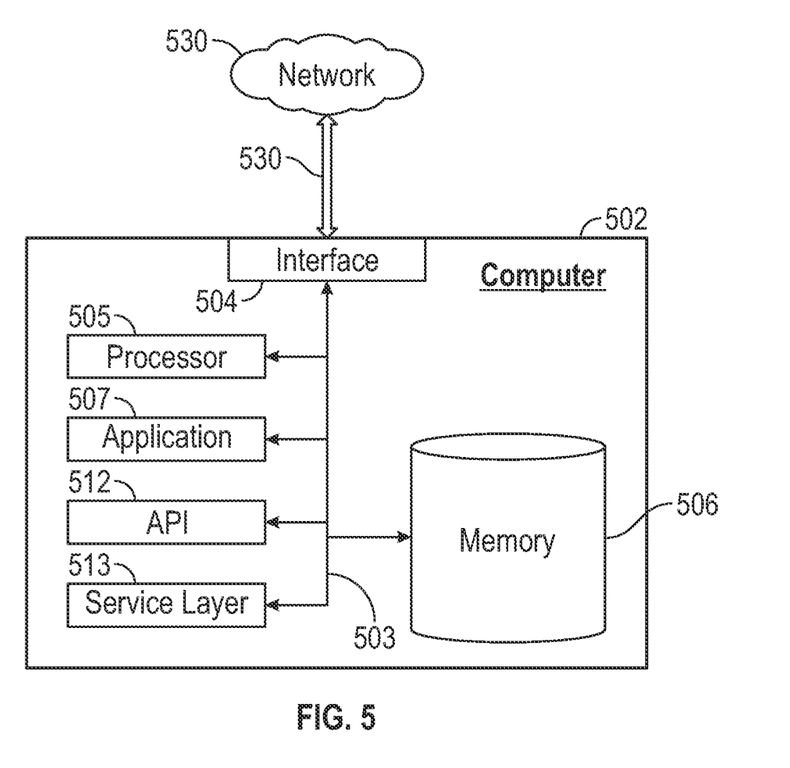
FIG. 5 depicts a computing system in accordance with one or more embodiments.

Embodiments of the present disclosure may be implemented on a computer system. FIG. 5 is a block diagram of a computer system (502) used to provide computational functionalities associated with described algorithms, methods, functions, processes, flows, and procedures as described in the instant disclosure, according to one or more embodiments. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). The memory may be a non-transitory computer readable medium. For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
   receiving modeling data, wherein the modeling data comprises gas parameters, field instrument data comprising a plurality of instrument logs acquired with a plurality of sensors, an inside diameter and an outer diameter of a flowline, and associated gas flow rate data for each of a first plurality of wells, wherein the plurality of instrument logs includes bottom hole pressure (BHP) data acquired with at least one downhole pressure sensor and choke size data of at least one choke valve on the flowline;
   splitting the modeling data into a training set, a validation set, and a test set, wherein the modeling data is split such that the modeling data of each well in the first plurality of wells resides exclusively in either the training, validation, or test set;
   pre-processing the modeling data, comprising:
      determining a mean and a standard deviation of each instrument log over the wells in the training set, subtracting the mean of each log from the same, and dividing each log by the standard deviation of the same;
   selecting a machine-learned model and architecture;
   training the machine-learned model to predict gas flow rate from the pre-processed modeling data using the training set;
   using the machine-learned model to predict gas flow rates using real-time field instrument data from one or more well not of the first plurality of wells, wherein the real-time field instrument data has been pre-processed similarly to the modeling data; and
   transmit, using a control system of the one or more wells, a command to control a choke parameter of a choke valve of each of the one or more wells based on the respective predicted gas flow rates.

2. The method of claim 1, further comprising:
   using the predicted gas flow rates to inform oil and gas field lifecycle decisions.

3. The method of claim 1, wherein the predicted gas flow rates serve as virtual gas flow rate meters applied to the one or more wells not of the first plurality of wells.

4. The method of claim 1, further comprising:
   evaluating the machine-learned model on the validation set;
   selecting another machine-learned model and architecture;
   training said another machine-learned model to predict gas flow rates from the pre-processed modeling data using the training set; and
   repeating the evaluation-selection-training process until a suitable machine-learned model is obtained.

5. The method of claim 1, further comprising:
   estimating the machine-learned model generalization error using the test set.

6. The method of claim 1, further comprising:
   monitoring the machine-learned model performance by checking for data drift of the real-time field instrument data.

7. The method of claim 1,
   wherein the machine-learned model is a support vector machine regressor.

8. The method of claim 1,
   wherein the plurality of instrument logs further comprises flowing wellhead pressure (FWHP) data, flowing wellhead temperature (FWHT) data, and shut-in wellhead pressure (SIWHP) data for each well in the first plurality of wells.

9. The method of claim 1,
   wherein pre-processing further comprises an imputation strategy, wherein the imputation comprises:
      replacing all missing values in the field instrument data with the nearest non-missing value.

10. A non-transitory computer readable medium storing instructions executable by a computer processor, the instructions comprising functionality for:
   receiving modeling data, wherein the modeling data comprises gas parameters, field instrument data comprising a plurality of instrument logs acquired with a plurality of sensors, and inside diameter and an out diameter of a flowline, and associated gas flow rate data for each of a first plurality of wells, wherein the plurality of instrument logs includes a bottom hole pressure (BHP) data acquired with at least one downhole pressure sensor and choke size data of at least one choke valve on the flowline;
   splitting the modeling data into training, validation, and test sets, wherein the modeling data is split such that the modeling data of each well in the first plurality of wells resides exclusively in either the training, validation, or test set;
   pre-processing the modeling data, comprising:
      determining a mean and a standard deviation of each instrument log over the wells in the training set, subtracting the mean of each log from the same, and dividing each log by the standard deviation of the same;
   selecting a machine-learned model and architecture;
   training the machine-learned model to predict gas flow rates from the pre-processed modeling data using the training set;

using the machine-learned model to predict gas flow rates using real-time field instrument data from one or more well not of the first plurality of wells, wherein the real-time field instrument data has been pre-processed similarly to the modeling data; and transmitting a command to control a choke parameter of a choke valve of each of the one or more wells based on the respective predicted gas flow rates.

11. The non-transitory computer readable medium of claim 10, the instructions further comprising functionality for:
evaluating the machine-learned model on the validation set;
selecting another machine-learned model and architecture;
training said another machine-learned model to predict gas flow rates from the pre-processed modeling data using the training set; and
repeating the evaluation-selection-training process until a suitable machine-learned model is obtained.

12. The non-transitory computer readable medium of claim 10, the instructions further comprising functionality for:
estimating the machine-learned model generalization error using the test set.

13. The non-transitory computer readable medium of claim 10, the instructions further comprising functionality for:
monitoring the machine-learned model performance by checking for data drift of the real-time field instrument data.

14. The non-transitory computer readable medium of claim 10,
wherein the machine-learned model is a support vector machine regressor.

15. The non-transitory computer readable medium of claim 10,
wherein the plurality of instrument logs further comprises flowing wellhead pressure (FWHP) data, flowing wellhead temperature (FWHT) data, and shut-in wellhead pressure (SIWHP) data for each well in the first plurality of wells.

16. A system, comprising:
a computer system comprising one or more computer processors;
a first plurality of wells connected according to a first pipeline configuration, wherein each well in the first plurality of wells is configured with a plurality of field instruments and a physical gas meter, and wherein the first plurality of wells share a first common gas meter;
a second plurality of wells connected according to a second pipeline configuration, wherein each well in the second plurality of wells is configured with a plurality of field instruments, and wherein the second plurality of wells share a second common gas meter; and
a trained machine-learned model stored on the computer system, wherein training the machine-learned model comprises:
receiving field instrument data from the field instruments of the first plurality of wells,
receiving individual gas flow rate data from each physical gas meter in the first plurality of wells and cumulative gas flow rate data for the first plurality of wells according to the first pipeline configuration using the first common gas meter,
selecting a machine-learned model and architecture, and
training the machine-learned model to predict individual gas flow rate data from the pre-processed field instrument data and cumulative gas flow rate data of the first plurality of wells
wherein the computer system is configured to:
execute the trained machine-learned model to predict individual gas flow rate data for the second plurality of wells upon receiving field instrument data from the field instruments of the second plurality of wells and cumulative gas flow rate data for the plurality of wells according to the second pipeline configuration using the second common gas meter.

17. The system of claim 16, wherein:
the first plurality of wells connected according to the first pipeline configuration is simulated; and
the simulation generates the field instrument data, the individual gas flow rates, and the cumulative gas flow rate for the first plurality of wells.

18. The system of claim 16,
wherein the first and second pipeline configurations comprise one or more boundary conditions relating to a flow of gas through the respective pipeline configuration.

* * * * *